United States Patent
Wang et al.

(10) Patent No.: US 12,459,123 B2
(45) Date of Patent: Nov. 4, 2025

(54) ROBOT SYSTEM WITH OBJECT DETECTING SENSORS

(71) Applicant: Mantis Robotics, Inc., Danville, CA (US)

(72) Inventors: Pei Jui Wang, New Taipei (TW); Gerry Vannuffelen, Danville, CA (US)

(73) Assignee: Mantis Robotics, Inc., Danville, CA (US)

( * ) Notice: Subject to any disclaimer, the term of this patent is extended or adjusted under 35 U.S.C. 154(b) by 314 days.

(21) Appl. No.: 18/167,851

(22) Filed: Feb. 11, 2023

(65) Prior Publication Data

US 2023/0256606 A1  Aug. 17, 2023

Related U.S. Application Data

(60) Provisional application No. 63/268,116, filed on Feb. 16, 2022, provisional application No. 63/268,272, filed on Feb. 19, 2022.

(51) Int. Cl.
| | |
|---|---|
| *B25J 9/00* | (2006.01) |
| *B25J 9/16* | (2006.01) |
| *B25J 13/00* | (2006.01) |
| *B25J 13/08* | (2006.01) |
| *G01S 13/00* | (2006.01) |
| *G01S 13/58* | (2006.01) |

(52) U.S. Cl.
CPC ........... *B25J 9/1676* (2013.01); *B25J 9/1694* (2013.01); *B25J 13/086* (2013.01); *G01S 13/58* (2013.01)

(58) Field of Classification Search
CPC ...... B25J 9/1676; B25J 9/1694; B25J 13/086; G01S 13/58
See application file for complete search history.

(56) References Cited

U.S. PATENT DOCUMENTS

| | | | |
|---|---|---|---|
| 7,385,550 B2 | 6/2008 | Winter et al. | |
| 7,783,386 B2 | 8/2010 | Merte et al. | |
| 9,043,025 B2 | 5/2015 | Brooks et al. | |
| 9,073,548 B2 | 7/2015 | Mizutani et al. | |
| 9,403,276 B2 | 8/2016 | Nishimura et al. | |
| 9,475,200 B2 | 10/2016 | Schlaich et al. | |
| 10,005,184 B2 | 6/2018 | Gerio et al. | |
| 10,295,331 B2 | 5/2019 | Albert et al. | |
| 10,422,870 B2 | 9/2019 | Mindell et al. | |
| 10,675,767 B2 | 6/2020 | Takaoki et al. | |
| 10,788,576 B2 | 9/2020 | Matthias et al. | |
| 10,800,032 B2 * | 10/2020 | Kamisono | B25J 13/086 |
| 11,014,240 B2 | 5/2021 | Cole et al. | |
| 11,318,617 B2 | 5/2022 | Nakayama et al. | |

(Continued)

FOREIGN PATENT DOCUMENTS

| | | |
|---|---|---|
| DE | 102016007520 | 12/2017 |
| DE | 212017000107 | 12/2018 |

(Continued)

*Primary Examiner* — Wade Miles
*Assistant Examiner* — Aaron G Cain

(57) ABSTRACT

A robot system is provided that includes movable parts, one or more object detecting sensors, and one or more processors, wherein the one or more object detecting sensors is dispose at or near the elbow, the wrist, or the position between the elbow and the wrist of the robot. Multiple embodiments are introduced for the implementation of the object detection of the robot system.

20 Claims, 9 Drawing Sheets

(56) References Cited

U.S. PATENT DOCUMENTS

| | | |
|---|---|---|
| 11,453,123 B2 | 9/2022 | Peng et al. |
| 2019/0061155 A1 | 2/2019 | Hashimoto et al. |
| 2019/0143522 A1 | 5/2019 | Miyazawa |
| 2019/0193267 A1 | 6/2019 | Peng |
| 2019/0270199 A1 | 9/2019 | Ning et al. |
| 2019/0366544 A1* | 12/2019 | Oka ................... B25J 9/1666 |
| 2019/0389069 A1* | 12/2019 | Kalbavi ................ B25J 9/0093 |
| 2021/0239794 A1 | 8/2021 | Fauth et al. |
| 2021/0394367 A1 | 12/2021 | Correll |
| 2022/0176560 A1 | 6/2022 | Akagi et al. |
| 2022/0203538 A1 | 6/2022 | Ning et al. |

FOREIGN PATENT DOCUMENTS

| | | |
|---|---|---|
| EP | 3605135 | 2/2020 |
| JP | 5343641 | 11/2013 |
| JP | 2018103345 | 7/2018 |
| JP | 2020075308 | 5/2020 |
| WO | 2018134112 | 7/2018 |

\* cited by examiner

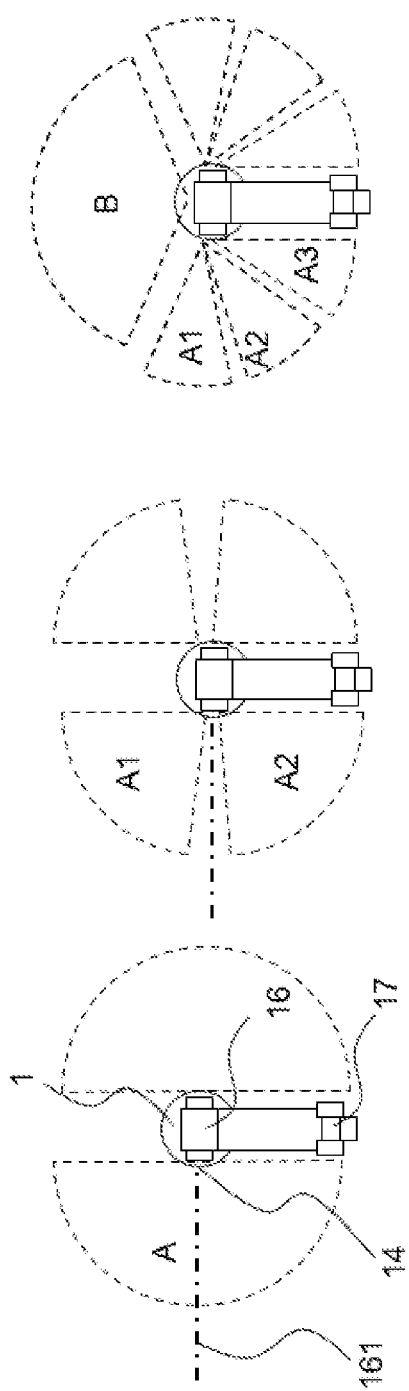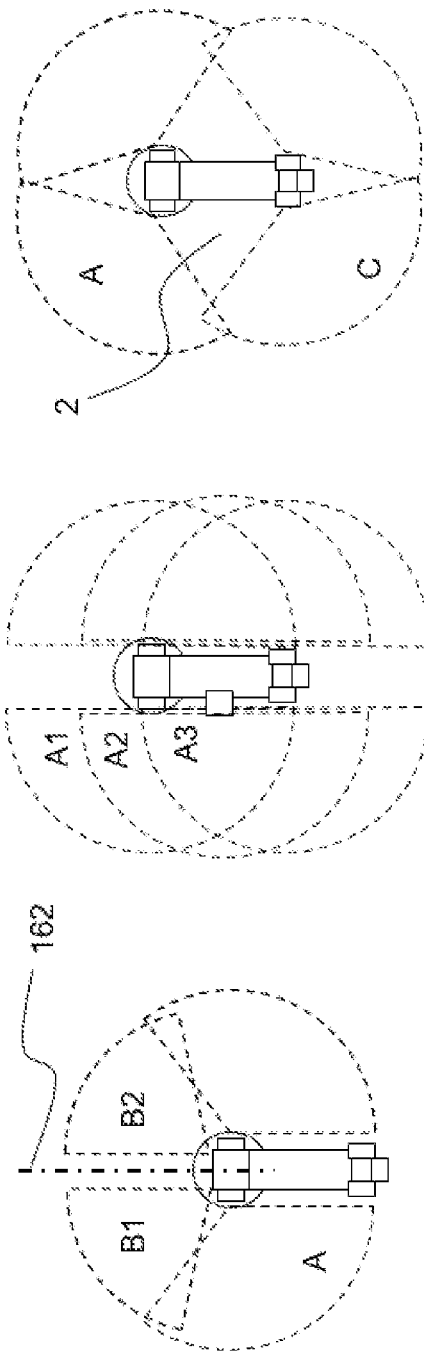

ROBOT SYSTEM WITH OBJECT DETECTING SENSORS

This application claims the benefit of U.S. Provisional Patent Application No. 63/268,272, filed Feb. 19, 2022, and U.S. Provisional Patent Application No. 63/268,116, filed Feb. 16, 2022, each of which is hereby incorporated by reference herein in its entirety.

FIELD

This disclosure relates to robotic systems and, more particularly, to safety systems for robots in human-robot collaboration.

BACKGROUND

Human-robot collaboration (HRC) is increasingly important in the development of industrial robots for better flexibility, ease-of-use, and physical footprint reduction in the manufacturing industry. HRC systems typically involve robots that interact in close proximity to humans. Care should be taken to minimize risks to humans posed by robots in HRC systems.

SUMMARY

A robot system is provided that includes movable parts having a base and a tool end; at least one actuator configured to drive at least one of the movable parts; a force limiting sensor; a casing element equipped on at least one of the movable parts; a joint position detection element coupled to at least one of the actuators; and one or more processors configured to measure a speed of the movable parts using the joint position detection element, to stop motion of the movable parts when the measured speed exceeds a speed limit, and to stop motion of the movable parts when the measured force exceeds a force limit.

To provide a better design of a robot for HRC, a robot system is introduced that comprises a plurality of movable linkages driven by joints with actuators; a base; a tool end in the last movable linkage; a wrist comprising at least a pivot axis, a rotational axis, or a linear axis that drives the tool end; one or more pivot joints each hinging a proximal linkage and a distal movable linkage to be included in an elbow or elbows of the robot; a plurality of joint monitoring sensors to monitor the position and/or speed of the joints; one or more object detecting sensors mounted at or close to the elbow, elbows, the wrist of robot, or the linkages between them, having a field of view, or a maximum azimuth and/or elevation angle of the combination of the fields of view, that covers the axial or radial direction of at least one pivot axis in the elbow, or elbows, or one direction of the axial or radial direction of at least one pivot or rotational axis in the wrist; one or more monitoring zones set relevant to the base or movable linkages comprising at least a first object monitoring zone; and one or more processors connecting the joint monitoring sensors and object detecting sensors, and is configured to process the information generated by the object detecting sensor, and when an intruding object is detected in the first monitoring zone, reduce the moving speed of the robot and monitor the speed of one or more monitoring points set on the movable linkages or around the tool end and stop the motion of the robot when the speed of one or more monitoring points exceed a set speed limit, or stop the motion of the robot.

In the robot system, at least one non-overlapping space between fields of view of the one or more object detecting sensors has a projection in the first object detection zone, wherein an overlap of the projection with the external object is smaller than a size of the external object when the at least one movable linkage is moving in a set movable range.

Multiple additional examples are disclosed, including examples to use sensors that generate detections of the object and environment, to be the object detecting sensor, for example an optical radar, an optical imaging sensor, an array of proximity sensor or an imaging radar, and the one or more processors is configured to detect the intruding object by comparing a set environmental model and detections of the object detection sensors. Other examples include using sensor that measure the speed of objects in the monitoring zone, for example a radar, to recognize an intruding object based on speed. Furthermore, multiple alternative examples for the mounting and arrangement for the object sensors, and the designs for the processor to perform in the HRC scenario based on the features above are also introduced.

BRIEF DESCRIPTION OF THE DRAWINGS

FIG. 6A is a diagram of an illustrative robot having one object detecting sensor in each side of its elbow in accordance with some embodiments.

FIG. 6B is a diagram of an illustrative robot having two object detecting sensors in each side of its elbow in accordance with some embodiments.

FIG. 6C is a diagram of an illustrative robot having object detecting sensors in each side of its elbow and in a radial direction of the elbow in accordance with some embodiments.

FIG. 6D is a diagram of an illustrative robot having one object detecting sensor in each side of its elbow and two object detecting sensors in a radial direction of the elbow in accordance with some embodiments.

FIG. 6E is a diagram of an illustrative robot having object detecting sensor in each side of its elbow, wrist, or the position between elbow and wrist in accordance with some embodiments.

FIG. 6F is a diagram of an illustrative robot having object detecting sensor in each side of its elbow and wrist in accordance with some embodiments.

DETAILED DESCRIPTION

The following description provides specific details for a thorough understanding of and enabling description for the disclosed embodiments. One of ordinary skill in the art will understand that one or more embodiments may be practiced without one or more of such specific details. In some instances, specific description of well-known structures or functions may have been omitted to avoid unnecessarily obscuring the description of the embodiments.

In human-robot collaboration (HRC) systems, robots can operate in close proximity to humans. In HRC systems, "speed and separation monitoring" is an important requirement that allows the robot to detect the presence or intrusion of a human (e.g., a human worker) at or near to the robot, to allow the robot to prevent or reduce hazards in its working range. Some HRC systems include an arrangement of object detecting sensors within the environment around the robot and the human workers, which involves increased cost and effort to set up and requires time-consuming calibration between the object detecting sensors and with the mounting position of the robot. Some HRC integrations arrange object detecting sensors in the base of a robot, but in many cases the field of view (FOV) of these sensors are easily blocked by workpieces and environmental objects in the plane that mounts the robot. Mounting object detecting sensors on the robot's movable linkages brings problems for providing an efficient coverage when the robot is moving in its overall joint movement ranges, especially on a six-axis articulated robot. Therefore, it may be desirable to provide HRC systems with improved robots for safely and efficiently operating in close proximity with humans.

Figure 1:
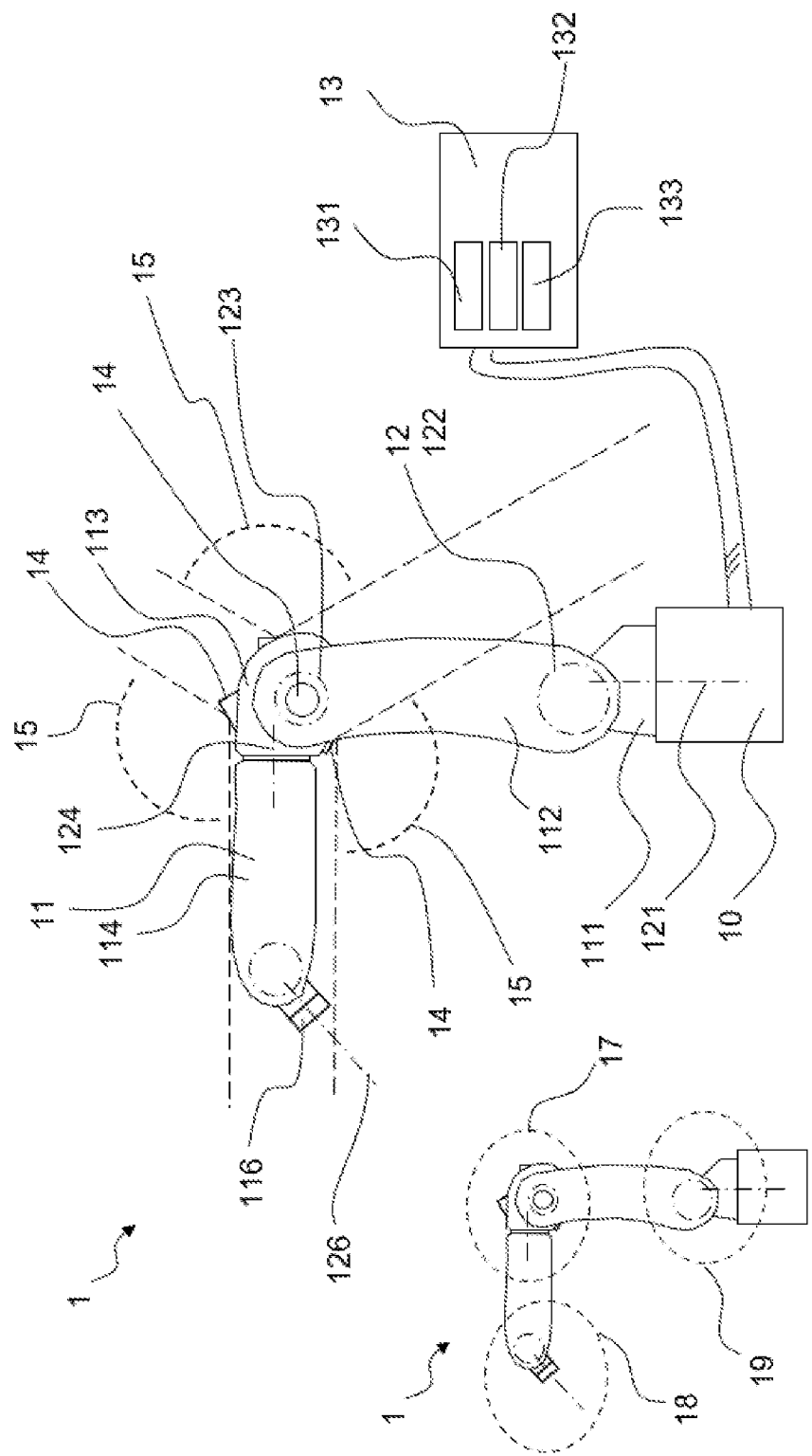
FIG. 1 is a diagram of an illustrative robot system in accordance with some embodiments.

FIG. 1 is a diagram of an illustrative robot system (sometimes referred to herein as a robotic system or an industrial robot system). As shown in FIG. 1, the robot system may include a robot such as robot 1 (e.g., a robotic arm). Robot 1 may include one or more (e.g., multiple) movable parts 11 (sometimes referred to herein as movable linkages 11 or linkages 11). Two or more movable parts 11 may be coupled together at a joint. The two or more movable parts may be movable (e.g., translatable, rotatable, etc.) with respect to each other about the joint. For example, two or more movable parts 11 may be coupled together and movable/rotatable about a shoulder 19 (e.g., one or more joints coupling a linkage 11 to the robot's base), an elbow 17 (e.g., one or more joints coupling two linkages 11 together), or a wrist 18 (e.g., one or more joints coupling a linkage 11 to a tool end 116 of the robot).

Movable parts 11 may be actuated by actuators in a joint, according to actuation axes 12 (sometimes referred to herein as actuation axis 12, motion axis 12, rotation axis 12, or pivot axis 12) as the motion axis (e.g., the axis of rotation or pivoting). Each movable part 11 may include a rigid housing or frame, for example. In the drawings herein, a linear dash-dotted line indicates a rotational axis parallel to the plane of the page, such as motion axis 121 of FIG. 1, and a circular dash-dotted line indicates a rotational axis with the motion axis perpendicular to the plane of the page (e.g., as shown by actuation axis 12 of FIG. 1).

Robot 1 may include a support structure such as mounting base 10 (sometimes referred to herein as base 10). At least one movable part 11 may be mounted to mounting base 10. For example, movable part 111 may be rotationally driven by the actuator disposed in the base 10, as the first joint of the robot (e.g., the first or most proximal movable part or linkage of the kinematic chain of linkages 11 in robot 1). One or more movable parts 11 of robot 1 may have a tool end 116 (e.g., the movable part 11 located the farthest from base 10 in the kinematic chain of movable parts 116 may be coupled to tool end 116, which is the end of the robot opposite mounting base 10). The tool end may include tool mounting structures that are configured to receive one or more tools to be mounted to robot 1. Robot 1 may perform any desired operations using the tool(s) mounted at the tool end (e.g., industrial operations, machining operations, manufacturing operations, sensing operations, mechanical operations, etc.).

The shoulder, elbow, and/or wrist of robot 1 as described herein may each include a respective pivot joint having a pivot axis hinging a respective proximal linkage (e.g., a linkage coupled to the joint that is closer or more proximal to base 10 in the kinematic chain of linkages 11 relative to the joint) and a respective distal linkage opposite the proximal linkage (e.g., a linkage coupled to the joint that is farther or more distal from base 10 (or closer to the tool end) in the kinematic chain of linkages 11 relative to the joint). The pivot joint may drive its proximal and distal linkages to perform a pivoting motion that changes the included angle between the proximal and distal linkages.

If desired, the shoulder, elbow, and/or wrist of robot 1 may each include one or more rotational axes before and/or after the corresponding proximal linkage and/or distal linkage of a pivot joint. If desired, the shoulder, elbow, and/or wrist may include one or more additional distal linkages and/or one or more additional proximal linkages relative to a given pivot joint. For example, in a six-axis articulated industrial robot (e.g., as shown by robot 1 in FIG. 1), the robot may have an elbow 17 that includes a pivot joint with a motion axis 123 (e.g., a pivot axis), a proximal linkage 112, a distal linkage 113 pivoting with respect to proximal linkage 112 according to motion axis 123 (e.g., at the pivot joint), and an additional linkage 114 (e.g., an additional distal linkage) that rotates about a rotation axis 124, to form a two-degree-of-freedom (2 DOF) elbow 17 that includes two motion axes and three linkages. In some other types of articulated robots, the elbow may include more or fewer degrees of freedom and/or linkages. For example, a four-axis articulated palletizing robot or a horizontal articulated robot may only include one motion axis pivoting a proximal linkage and a distal linkage in its elbow (1 DOF, 2 linkages), whereas a seven-axis robot may include an additional rotation axis (e.g., relative to the elbow of a six-axis robot) and a rotation linkage connecting to the proximal linkage in its elbow, which has 3 DOF and 4 linkages.

In general, the shoulder, elbow, or wrist of a vertical articulated robot may include at least a pivot joint. A horizontal articulated robot (e.g., a Selective Compliance Assembly Robot Arm (SCARA) robot) may include at least a pivot joint in its shoulder and elbow, whereas its wrist may sometimes include a linear axis and a rotational joint. A vertical articulated robot and a horizontal articulated robot may have a wrist including a rotational joint (e.g., about rotation axis 126) to rotate their tool end (e.g., tool end 116). Because the rotational joint driving the tool end is intended to be fixed with different shapes of tool or tools, the rotational axis that rotates the tool end in the wrist of a robot sometimes is referred to herein as a rotation axis or a pivot axis (e.g., to pivot some types of tools with a shift longitudinal axis).

The robot system may include a control equipment such as controller 13. Controller 13 may, for example, include one or more processors (e.g., central processing units (CPUs), graphics processing units (GPUs), integrated circuits (ICs), application specific integrated circuits (ASICs), microprocessors, etc.) and storage such as storage device 133 (e.g., storage circuitry, non-volatile memory, volatile memory, one or more hard drives, solid state drives, read-only memory, flash memory, etc.). Storage device 133 may store processing instructions such as software code. The one or more processors may control the operations of robot 1 and/or one or more components of the robot system by running or executing code stored on storage device 133. Controller 13 may include a motion control module 131 (sometimes referred to herein as motion controller 131, motion control processor 131, motion control circuitry 131, or motion control engine 131) and a safety control module 132 (sometimes referred to herein as safety controller 132, safety control processor 132, safety control circuitry 132, or safety control engine 132). If desired, controller 13 may receive user input from a user or operator of robot 1 or the robot system (e.g., via a user input device). Controller 13 may also generate output for the user (e.g., audio output, visual output on a display or other visual indicator, haptic or vibrational output, etc.).

Motion control module 131 and the safety control module 132 may include, for example, a central processing unit (CPU), digital signal processor (DSP), microcontroller unit (MCU), ASIC, and/or field programmable gate array (FPGA), may include two individual hardware modules, and may include a two software module or system in the same CPU, DSP, MCU, ASIC, FPGA under the management of a hypervisor software to ensure the non-safety part (e.g., the motion control module) will not affect the safety part, etc.

Robot 1 may include one or more (e.g., multiple) object detecting/detection sensors 14. Object detecting sensors 14 may be disposed on one or more movable parts 11. Each object detecting sensor 14 may have a respective sensing field of view (FOV) 15 (e.g., where each object detecting sensor 14 has an FOV 15 oriented in a respective direction/angle), within which the object detecting sensor is capable of sensing or detecting the presence, absence, movement, or other characteristics of external objects such as body parts of a user. The FOVs 15 of object detecting sensors 14 may have the shape of a cone, a lobe, a pyramid, or any other desired shape. Robot 1 may include different types of object detecting sensors 14 that work under different physical principles (e.g., radio-based sensors, optical-based sensors, capacitive sensors, resistive sensors, acoustic sensors, etc.).

If desired, object detecting sensor 14 may have a dual channel structure, to comply with industrial standards for some robot systems which may have a higher risk for HRC. One example of a dual channel structured for object detecting sensor 14 is when object detecting sensor 14 includes at least two detecting elements or receivers with overlapping detecting FOVs (e.g., where the FOV 15 of the object detecting sensor is given by the combination of the overlapping detecting FOVs). In this example, the robot system may include one or more processors configured to compare the sensing output of the at least two detecting elements or receivers and may stop motion of the robot when or while a difference in the sensing result outputs from the at least two detecting elements or receivers exceeds a set threshold.

Robot 1 may include one or more joint monitoring elements (not shown in the figure). Object detecting sensors 14 and the joint monitoring elements may be communicably coupled to safety control module 132 (e.g., via one or more wired and/or wireless links). For example, controller 13 may be coupled to robot 1 via one or more data, control, and/or power lines (e.g., over one or more cables).

Controller 13 may send control signals that control the operation of robot 1 over the one or more cables. Controller 13 may receive signals from robot 1 (e.g., object detecting sensors 14 and joint monitoring elements 134) over the one or more cables.

The joint monitoring elements may include encoders mounted on the actuator of the joint and/or current/pulse monitoring components in the servo drivers of the actuators for movable parts 11. The joint monitoring elements may generate speed and position information associated with the joints. The joint monitoring elements may transmit the speed and position information to safety control module 132. The joint monitoring elements may sometimes be referred to herein as joint monitoring components or joint monitors.

Figure 2:
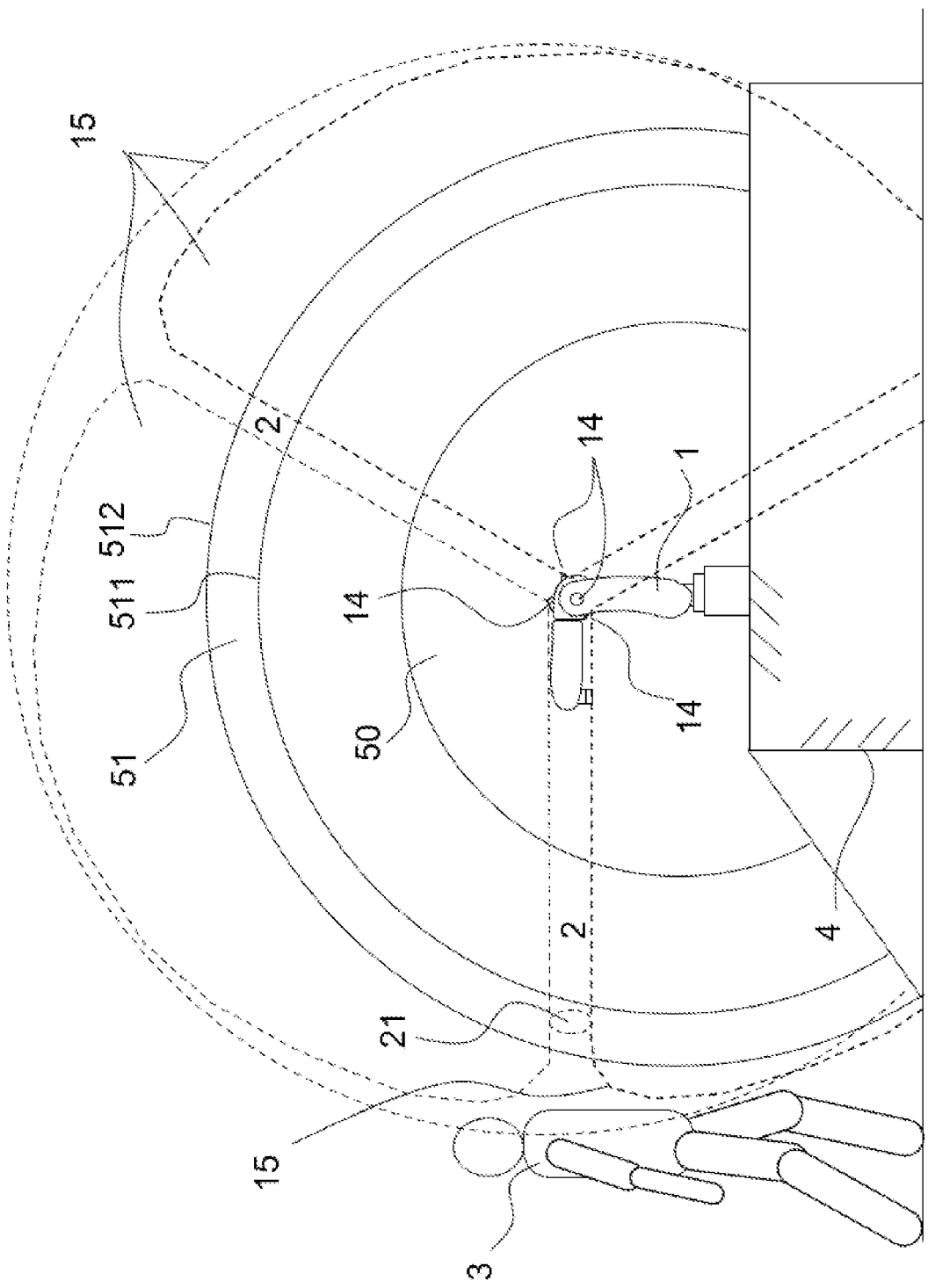
FIG. 2 is a side view of an illustrative robot system that detects intruding objects in accordance with some embodiments.

FIG. 2 shows one example of the robot system working in HRC (e.g., in an HRC system). As shown in FIG. 2, robot 1 may be mounted on a table 4 (or another surface) and may have a working range 50. Working range 50 may be defined or constructed by the maximum joint movement range of each axis of the robot. For example, some robots may have their joint movable ranges over 360 degrees, and in these cases the working range 50 may be a full sphere (excluding some internal singular space). Working range 50 may be constrained by mechanical limits on the joints or a software limit set in the safety control module 132. Object detecting sensors 14 may be mounted on robot 1, for example, the mounting positions shown in FIG. 1, and each has its sensing or detecting FOV 15.

As shown in FIG. 2, safety control module 132 may be set or configured to monitor a spatial volume or area such as a first monitoring zone 51 relevant to base 10 or some other movable linkage(s)/joint(s) of the robot (e.g., elbow 17 of the robot in FIG. 1). First monitoring zone 51 may have an external boundary 512. First monitoring zone 51 may be shaped by any kind of spatial volume, for example, a sphere, or a complex enveloped body. The size or shape of first monitoring zone 51 may be dynamically modulated by safety control module 132 according to kinematic information of the robot, for example, the speed, and pose of the robot. If desired, first monitoring zone 51 may have an internal boundary 511, and first monitoring zone 51 may have a shell volume with a certain thickness (e.g., as defined by external boundary 512 and internal boundary 511). In some examples, first monitoring zone 51 may be a two-dimensional zone or area, for example, a horizontal articulated robot may be set with a two-dimensional first monitoring zone 51, because most of its linkages move in a horizontal space.

Monitoring zones and working range may have any spatial relationship between them, like one covering the other, one covering part of the other, or totally separated. For example, a robot may be set with safety positional software limits that prevent the robot to move its linkages to the region behind the robot, and the environment may be set so that a human can only approach the robot from behind. In this example, the working range of the robot is the space in front of the robot, but a monitoring zone may be set that monitors the back side of the robot (e.g., where the monitoring zone is completely separated from the working range of the robot), because a human approaching from the back side of a robot may still end up reaching the robot's movable linkages (e.g., by stretching their arm or hand into the working range of the robot).

The robot system may perform HRC by detecting intruding objects using object detecting sensors 14. For example, the robot system may detect a human 3 intruding into the monitoring zone(s) and, upon such a detection, may decrease the speed of the robot or stop the robot safely using the safety control module 132. In some examples, robot 1 may be an industrial robot without other HRC safety functions, and it may safely stop when a human is detected within first monitoring zone 51. In some examples, robot 1 may be an industrial robot provided with other HRC safety functions, like power and force limiting (PFL) safety functions (e.g., by having force and/or torque sensors in the joints/tool ends/casing), which may allow the robot to continue to work with a human in a set speed (e.g., a collaborative speed set by risk assessment according to the performance of the PFL sensor and the stopping performance of the robot) so as to allow a human to enter its working range. In such case, robot 1 may decrease the speed to a collaborative speed when a human is detected within first monitoring zone 51.

If desired, the robot system may include one or more immunity zones set by users to prevent a non-intended object detection, such as a moving conveyor that carries workpieces, or the opening/closing of a machine door in a monitoring zone.

The range of monitoring zone 51 may relate to the motion speed of the robot (when no person is intruding), the response time of object detecting sensors 14, the processing time of safety control module 132, and the stopping or speed decreasing performance of robot 1. The relation may be given by formula 1.

$$S_p \geq V_h \times (T_r + T_s) + V_r(T_r) + S_s + Z \qquad (1)$$

In formula 1, $S_p$ is the safety distance to be set in HRC to trigger the safety actions (e.g., decrease the speed or stop), $V_h$ is the speed of a human, $T_r$ is the total time needed from the moment that a human is detected to the moment that a safety action command (e.g., to decrease the speed of robot or stop the robot) is generated and sent out, which includes the response time of an object detecting sensor 14 and the processing time of safety module 132, $T_s$ is the time that the robot needs to perform the safety action to reach a safe state (a safely monitored decreased speed, or a standstill state), $V_r$ is the motion speed of the robot before it takes a safety action, $S_s$ is the distance that the robot may travel before finally reaching the safe state (e.g., a speed decreasing distance or a stopping distance), and Z is other distance conditions, like accuracy of the object detecting sensor.

For example, robot 1 may have a working range with a radius of 1 meter (which is equal to its maximum extended reach from the mounting base), and may be allowed to move with its full speed (e.g., 12 meters per second) in its tool end, with no human inside or intruding into monitoring zone 51. When a human is moving toward the robot with a speed 1.6 meters per second, the robot needs to decrease its speed to a collaborative speed (e.g., 1 meter per second), while $T_r$ of the safety system (e.g., the combination of object detecting sensors 14 and safety control module 132) is 0.2 second and the robot has a $T_s$ which is 0.4 seconds in a worst case scenario. In such an example, before the robot starts to perform a safety action, the human has moved toward the robot for 0.96 meters (e.g., because 1.6×(0.2+0.4)=0.96). For such a case, with a simplified risk assessment (e.g., not considering the pose of the robot at detection and the distance to slow down or stop, and using the maximum reach to replace the term $V_r(T_r) + S_s$ in equation 1), the safety distance may be 1 meter (to at least cover 0.96 meter and accuracy of the object detecting sensor) plus the radius of the working range of the robot, which is set to the outer boundary 512 of first monitoring zone 51 as a sphere with a radius of 2 meters from the mounting position of the robot. If desired, more conditions can be taken into consideration and design of the scenario to have a shorter safety distance, for example, to limit robot 1's working range into a smaller space (so no need to always consider the full reach of the robot) monitored by safety control module 132, to have a more detailed on-line calculation for $V_r$, $T_r$ and $S_s$ in safety control module 132 through a dynamic model considering safely monitored pose, speed, and the dynamic performance of safety actions (not always the worst case), or to set a dynamic first monitoring zone 51 (e.g., not always a fixed range from the base) for safety control module 132, etc.

The arrangement of object detecting sensors 14 on a robot is important for providing sufficient coverage in an HRC application. Mounting the object detecting sensors in base 10 may cause the FOVs of the sensors to have a high probability of being occluded by environmental objects, like trays carrying workpieces and cabinets of equipment or machines, and need a clear space in the place that mounts the robot—but in most cases it is hard to keep an empty mounting and/or working table, or an empty mounting floor of a robot, which at the same time brings a high floor/space cost. Mounting multiple object detecting sensors on the ceiling, or on a supporting structure at a high position to let the FOV cover the downward area may solve some occlusion problems, but this kind of arrangements require an infrastructural setup to the environment, and require complex calibration between the sensors and the robots in set up, that has an additional cost before first deployment, and every time when performing changeover. Mounting object detecting sensors on the movable linkages of a robot has the advantage of avoiding occlusion as much as possible, and may provide a built-in, calibration-free (after factory installation) solution for a robot provided for HRC. But, there is still a need to provide a sufficient coverage from the combination of the FOVs of the object detecting sensors mounted on the robot. An object detecting sensor with a long detecting distance (for example, two to three meters for a robot with one meter maximum reach) may cost more than short range proximity sensors like capacitive sensors, so it may not be practical to mount this kind of sensor everywhere around the movable parts of the robot. So, there is still a need to have an optimized arrangement of object detecting sensors on the robot, as well as efficient safety sensing and processing algorithms for the robot, especially when the robot is moving within all of its joint movable ranges.

Figure 3:
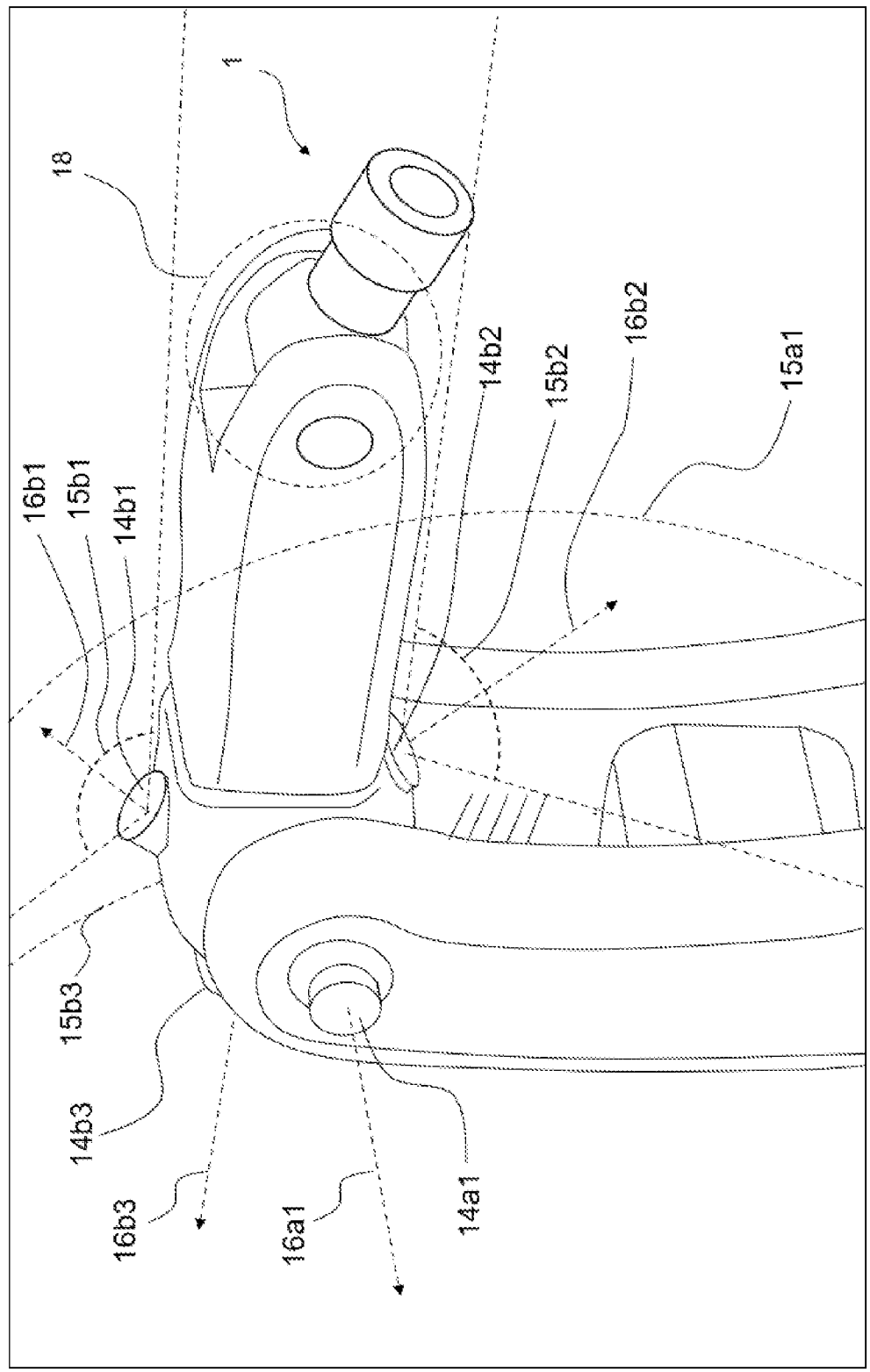
FIG. 3 is a perspective view of an illustrative robot having object detecting sensors in accordance with some embodiments.
Figure 4:
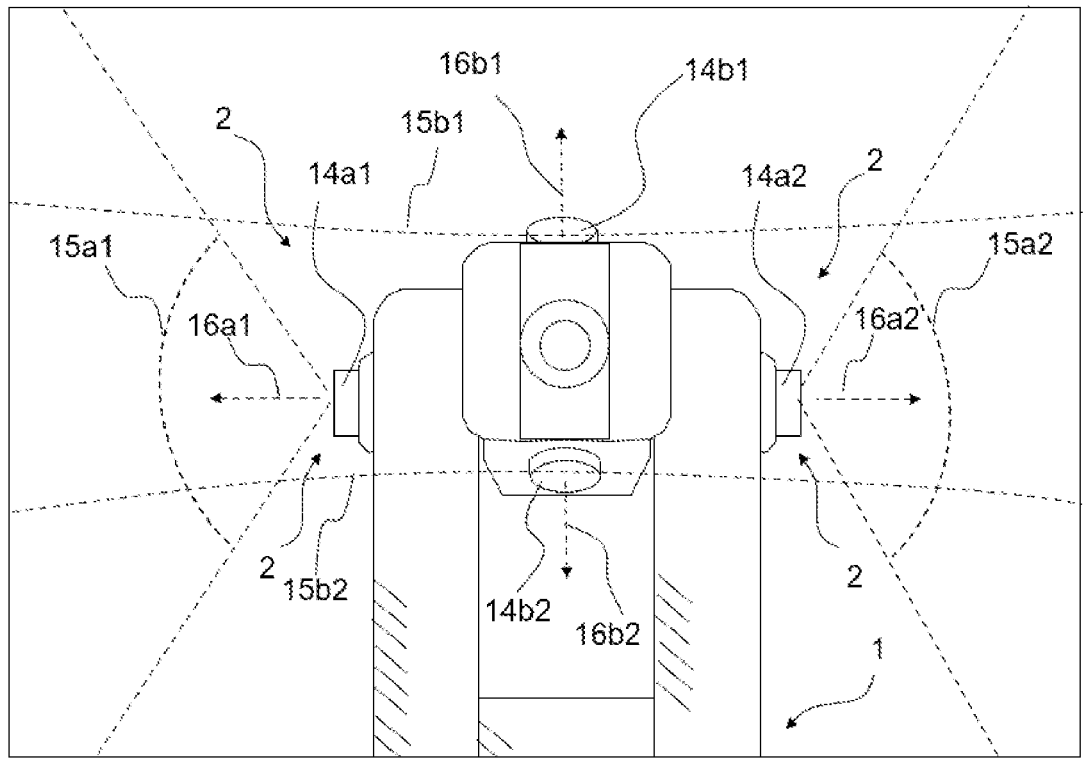
FIG. 4 is a front view of an illustrative robot having object detecting sensors in accordance with some embodiments.

FIG. 3 and FIG. 4 show examples of how object detecting sensors may be disposed on the movable linkages of the robot. Robot 1 may include object detecting sensors 14 such as object detecting sensors 14a1, 14a2 14b1, 14b2, and 14b3 mounted at the elbow of the robot (e.g., on one or more linkages and near or adjacent to the pivot joint or other joints in the elbow). Each object detecting sensor may have a respective FOV 15. For example, object detecting sensor 14a1 may have FOV 15a, object detecting sensor 14a2 may have FOV 15a2, object detecting sensor 15b1 may have FOV 15b1, object detecting sensor 14b2 may have FOV 15b2, and object detecting sensor 14b3 may have FOV 15b3. Object detecting sensors 14b1, 14b2, and 14b3 and their corresponding FOVs have been omitted from FIG. 4 so as to not unnecessarily obscure the drawings. Dashed lines 16a1 and 16a2 of FIGS. 3 and 4 and dashed lines 16b1, 16b2 and 16b3 of FIG. 3 are assistive markers that point out the central detection of FOVs 15a1, 15a2, 15b1, 15b2, and 15b3 respectively (e.g., to help illustrate the direction/orientation of each FOV). While each object detecting sensor 14 exhibits a respective FOV 15, all of the object detecting sensors 14 may collectively exhibit a total object detecting FOV that is given by the sum of all of the FOVs 15 (sometimes referred to herein as a total FOV, cumulative FOV, overall FOV, aggregate FOV, or a maximum azimuth and/or elevation angle of the combination of the different fields of view of the sensors 14). This arrangement may provide a sufficient overall FOV around robot 1. Mounting the object detecting sensors at/around the elbow of the robot may allow the object detecting sensors to have a relatively high monitoring position—for example, in a working task (e.g., a pick-and-place working program where the robot is mounted with a gripper to pick up workpieces from the trays placed on the same table surface that the robot is mounted on, and place them on other trays) of a vertical articulated robot mounted on a floor or a table, like the pose of robot 1 shown in FIG. 3 and FIG. 4. Such relatively high monitoring positions may provide a clearer FOV that has less chance to be occluded by environmental obstacles. The wrist 18 of robot 1 shown in FIG. 3 may have a similar combination of pivoting axis like the elbow, and may provide equal effect to mount the object detecting sensors in a similar arrangement of the object detecting sensors at the elbow, in a case where the robot is mounted on a ceiling or wall, and the wrist may become the most suitable joint to arrange these object detecting sensors. So, the robot system may have object detecting sensors 14 arranged at/around the pivot axis of its elbow (e.g., the pivot axis of a pivot joint in elbow 17) in a way as is illustrated by the examples shown in FIG. 3 and FIG. 4, and/or may have object detecting sensors 14 arranged similarly around a pivot joint or axis in its wrist (e.g., the pivot axis of a pivot joint in the wrist 18), according to different intended setups for the robot.

Figure 5:
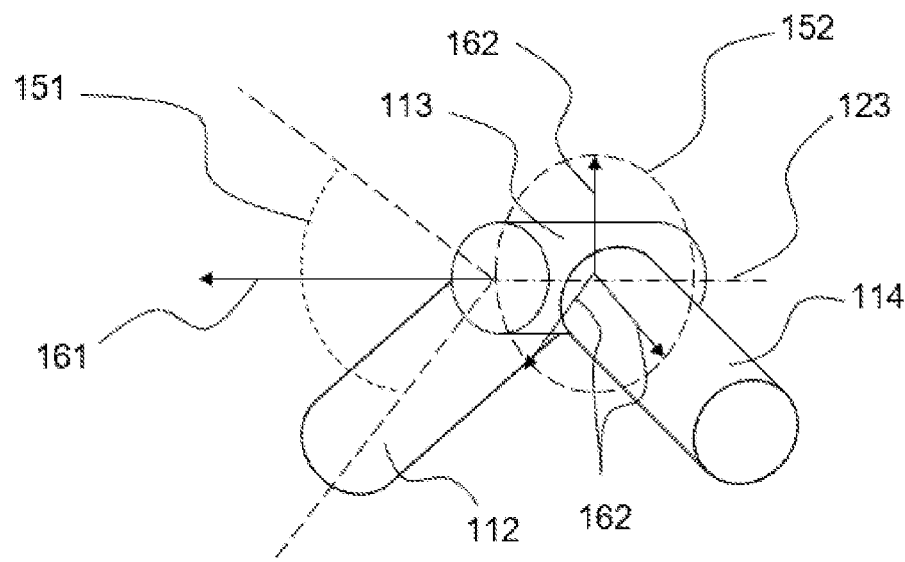
FIG. 5 is a perspective view showing relationships between a pivot joint's axes and the field of view of object detecting sensors in accordance with some embodiments.

FIG. 5 shows one example of the simplified structure of a pivot joint of a robot. The example of FIG. 5 may be used to form some or all of an elbow of the robot or a wrist of the robot. As shown in FIG. 5, pivot joint 113 has a pivot axis 123, to hinge a proximal linkage 112 and a distal linkage 114 (e.g., where proximal linkage 112 and distal linkage 114 are hinged to rotate with respect to each other around/about pivot axis 123). When arranging and mounting object detecting sensors 14 to cover a maximum combined FOV, the object detecting sensors may be arranged to have a FOV 151 that covers (includes) the axial direction 161 of pivot axis 123 (e.g., the direction parallel to and colinear with pivot axis 123), and to have a FOV 152 that covers (includes) the radial directions 162 of pivot axis 123 (e.g., directions perpendicular to axial direction 161 and directed radially outward from pivot axis 123).

The examples shown in FIGS. 3-5 may allow the robot to have a sufficient total object detecting FOV around its elbow or wrist. If desired, one or more object detecting sensors 14 may be added or arranged to provide a seamless coverage of the combined FOV at first monitoring zone 51 (FIG. 2), which means having a non-covered FOV space of zero. But the robot system may have other means to work in HRC that may make sure to detect an object with a set dimension, while the non-covered FOV space is not zero.

For example, referring back to FIG. 2, the non-covered space 2 due to the occupied volume of the robot's linkage (e.g., the proximal or distal linkage in a pivot joint) in the space, and/or the possible shape of FOV (for example, a lobe, a cone, or a pyramid), may be considered in the design of the robot system such that the intersection of the non-covered space 2 with first monitoring zone 51 within a projection 21 (FIG. 2) is smaller than a set minimum detecting object dimension (e.g., the dimension of a human torso).

Furthermore, returning to FIG. 4, the non-covered space 2 between FOV 15b1, FOV 15b2, FOV 15a1 and FOV 15a2, may be a complex body that has a complex shape of projection in the first monitoring zone due to the shape of the FOV (for example, a lobe shaped FOV) of object detecting sensors 14. In such a case, although some of the dimensions of the projection of the non-covered space in first monitoring zone 51 may be larger than a set dimension of the object to be detected (e.g., the maximum width of the projection may be wider than a human torso's width), the robot system may make sure to detect a set object's dimension by configuring the projection of the non-covered space 2 to not be a superset of a set object dimension. For example, the width (or azimuth direction) of the projection of the non-covered space 2 may be larger than a human torso's width, but in the elevation direction (from an upper boundary to a lower boundary) it may be smaller than a human torso's longitudinal dimension (e.g., from the neck to the waist). So, for the purpose of detecting a set object, the robot system may be provided with non-overlapping space between the field of view of object detecting sensors 14 having a projection in the first object detection zone to be zero, smaller than the object to be detected, or not a superset of a set dimension of the object to be detected, when the robot is moving in a set movable range. As used herein, "a superset" may also be understood as "entirely contains," "fully includes" or the case "the set dimension of the object to be detected is a subset of the non-overlapping FOV in the monitoring zone." While at the same time, an overall description of the method may be, arranging the object detecting sensors 14 so that the overlap between the blind spots (e.g. the non-overlapping space between the field of view of object detecting sensors 14) and the object to be measure is smaller than the size of the said object, when the robot is moving in a set movable range.

The advantage of the disclosed examples includes maintaining an equal and stable combined FOV for object detecting whenever the robot rotates or moves all its joints. The disclosed examples may avoid problems like the non-covered spaces 2 changing their size when the robot moves freely within the combination of all its joint movable ranges. Basically, the concept may be proximally understood to build a spherical monitoring volume or shell with tunnels or holes on its surface, and when the robot is moving freely, the sphere moves and rotates, but the size of tunnels or holes does not change.

FIG. 6A, FIG. 6B, FIG. 6C, FIG. 6D, FIG. 6E and FIG. 6F show more examples of the robot system, with different ways of arranging one or more object detecting sensors 14 on robot 1, near the elbow 16 or wrist 17, or in a position between elbow 16 and wrist 17. The dashed lines indicate the FOVs of the object detecting sensors 14, in an expression of the covered angles, and does not indicate their true detecting distances.

FIG. 6A shows one example in which one object detecting sensor 14 is mounted on each side of the elbow, each one with a respective FOV 15 covering the axial direction 161 of the elbow (e.g., a direction parallel to and centered on the pivot axis of a pivot joint in the elbow). FIG. 6B shows one example in which two object detecting sensors 14 are mounted on each side of the elbow, where the object detecting sensors have FOV A1 and FOV A2, but FOV A1 or FOV A2 may not cover the axial direction 161 of the elbow, thereby producing a non-covered space between them (e.g., where the total FOV covers a direction between the axial direction and the radial direction of the pivot axis). FIG. 6C shows one example in which object detecting sensors 14 having FOV A1, FOV A2, and FOV A3 are disposed on either side of the elbow, with an additional object detecting sensor 14 having a FOV B that is larger than FOV A1, FOV A2, and FOV A3 and that covers most of the backward space. FIG. 6D shows one example in which an object detecting sensor 14 having FOV B1 is mounted on a first side of the elbow and an object detecting sensor 14 having FOV B2 is mounted on a second side of the elbow for covering the backward space, while the radial direction 162 of the pivoting axis of the elbow is not covered by FOV B1 and FOV B2. If desired, additional object detecting sensors 14 may be mounted on either side of the elbow to cover the forward space (e.g., FOV A).

Some object detecting sensors, for example laser radar (Lidar) sensors, radar sensors, or any sensors that emit signals or energy waves, may be susceptible to interference with each other. This interference may be mitigated by modulating and separating each sensor's emission timing and/or wave form/frequency, and/or by separating their FOV (e.g., mounting object detecting sensors 14 on the robot with non-overlapping FOV), if the projection of the non-covered space between the FOV in the monitoring zone can be smaller than the set minimum detectable object. The examples in FIG. 6B, FIG. 6C, and FIG. 6D show arrangements to combine some object detecting sensors having a smaller FOV to cover a sufficient FOV and may have FOV's separated from each other in order to not interfere with each other.

According to these examples, the disclosed arrangement of object detecting sensors do not need to directly cover the axial direction and/or the radial direction of the joint, so in general the description for the arrangement of the object detecting sensors may be to have a field of view or a combined FOV, with a maximum azimuth and elevation angular range (e.g., a maximum azimuth angular range starting from the right boundary of FOV A1 and ending at the left boundary of FOV A2 in FIG. 6B) including the axial and radial direction of at least a pivot axis of the pivot joint in an elbow or elbows of the robot. In cases where the FOV has a spatial volume (e.g., a three-dimensional FOV), the examples may mean having a field of view or a combined FOV, at least covering a non-perpendicular direction and a non-parallel direction to at least a pivot axis of the pivot in an elbow or elbows of the robot.

FIG. 6E shows an example of how object detecting sensors 14 may be mounted in sides of the elbow of the robot (having FOV A1), in the sides of the wrist (having FOV A3), and in the sides of the linkage between the elbow and the wrist (having FOV A2). These mounting positions may bring similar effect, in cases that the maximum detectable distance of object detecting sensor is much larger than the maximum reach, or the length of a lower arm (the part between the elbow and wrist) of the robot.

FIG. 6F shows one example in which object detecting sensors 14 are not mounted directly along the axial or radial direction of the pivot axis of a pivot joint in the elbow or wrist, but may each cover the axial and radial direction of the pivot axis. The example in FIG. 6F further shows the non-covered space 2 of the FOVs may exist in the inner side of the combination of the FOVs, and may not cause a hole or tunnel in the external boundary of the monitoring zone. For example, the object detecting may detect an intruding human in a range between 2 meters and 2.5 meters from the base of robot without monitoring a human within a range of 2 meters, which works similar to a light curtain that detects the pass through of objects.

Figure 7C:
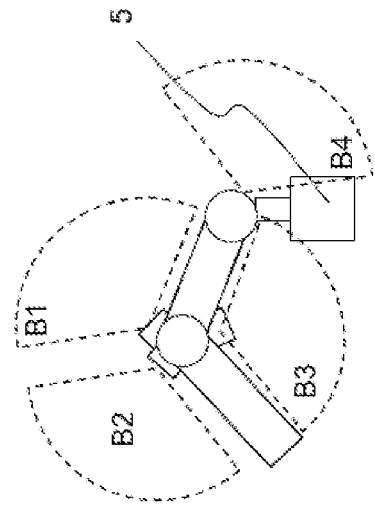
FIG. 7C is a diagram of an illustrative robot having object detecting sensors covering the radial directions of its elbow's motion axis and object detecting sensors in its wrist in accordance with some embodiments.
Figure 7B:
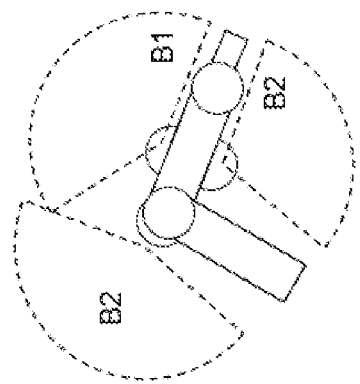
FIG. 7B is a diagram of an illustrative robot having object detecting sensors covering some radial directions of its elbow's motion axis and object detecting sensors in the linkage between its elbow and wrist in accordance with some embodiments.
Figure 7A:
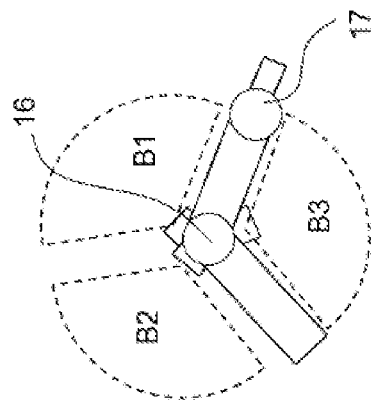
FIG. 7A is a diagram of an illustrative robot having object detecting sensors covering the radial directions of its elbow's motion axis in accordance with some embodiments.

FIG. 7A, FIG. 7B, and FIG. 7C are side views showing more examples of how object detecting sensors 14 may be arranged on the robot. FIG. 7A shows one example in which three object detecting sensors 14 cover the radial direction of the pivot axis in elbow 16 of the robot. FIG. 7B shows one example in which object detecting sensors 14 are mounted in the upper side and lower side of the linkage between the elbow and the wrist of the robot, which may have similar effect as in the example shown in FIG. 7A. FIG. 7C shows one example similar to the example in FIG. 7A, but with an additional object detecting sensor 14 covering some radial directions of the pivot axis in the wrist of the robot, which may bring additional advantages in some applications. For example, in FIG. 7C, the FOV B4 of an object detecting sensor 14 may cover the frontal FOV when the tool end is pointing downward and lifting a large workpiece 5, which may occlude some part of FOV B3.

Figure 8B:
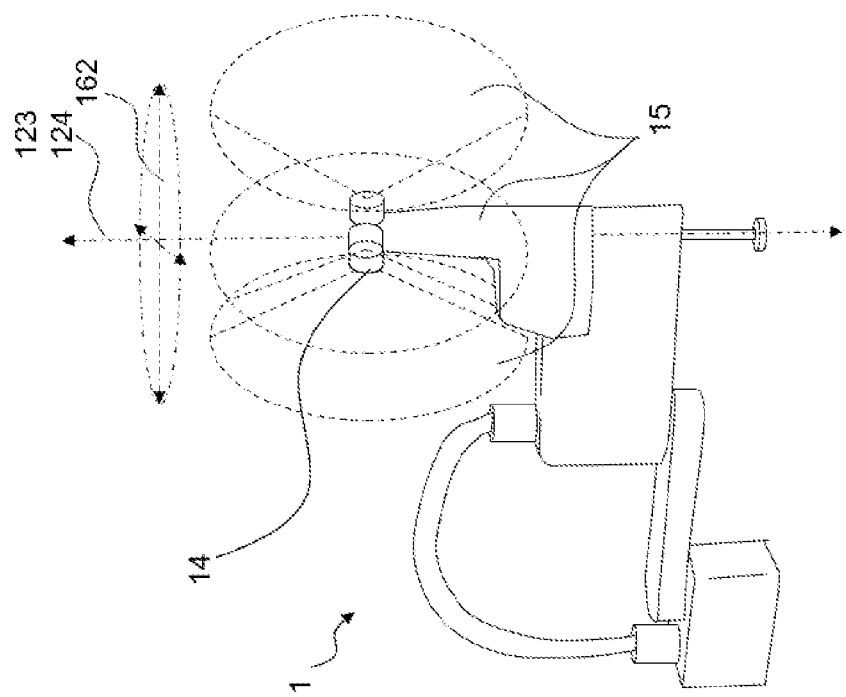
FIG. 8B is a diagram of an illustrative SCARA type robot having object detecting sensors in a casing structure on top of its linear axis in accordance with some embodiments.
Figure 8A:
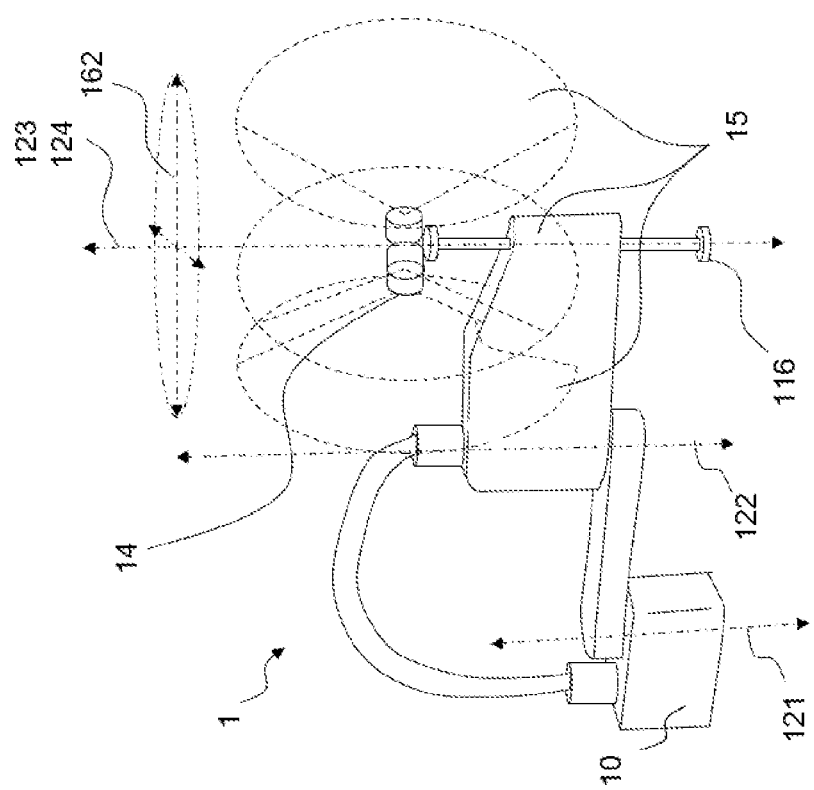
FIG. 8A is a diagram of an illustrative SCARA type robot having object detecting sensors on top of its linear axis in accordance with some embodiments.

FIG. 8A, FIG. 8B, FIG. 9A, and FIG. 9B show examples for mounting object detecting sensors 14 on a horizontal articulated robot. A horizontal articulated robot, or a SCARA type robot like the robot 1 shown in FIG. 8A, may include a base 10 and may include multiple movable linkages hinged a pivot axis 121 and pivot axis 122. Robot 1 may have a final end linkage that carries tool end 116, moving upward and downward linearly along linear axis 124, with rotation about pivot axis 123. If desired, the motion about pivot axis 123 and along linear axis 124 may be performed with two actuators that are mechanically coupled to a ball screw. The pivot axis 122 may be located at the elbow of robot 1, while the combination of pivot axis 123 and linear axis 124 is located at the wrist of robot 1, for example. FIG. 8A shows one example arranging object detecting sensors 14 in a position in the wrist of robot 1 by setting a ring of object detecting sensors 14 on top of linear axis 124, each with a monitoring FOV 15. In the case shown in FIG. 8A, object detecting sensors 14 may move up and down following motion axis 124 and may be rotated following pivot axis 123.

FIG. 8B shows one example of robot 1 that may mount object detecting sensors 14 on top of a casing element that covers the top of the final movable linkage. In this case the object detecting sensors 14 may not be rotated and/or moved according to pivot axis 123 and/or linear axis 124, and hence may have a simpler wiring arrangement for object detecting sensors 14 than in the example of FIG. 8A. The examples shown in FIG. 8A and FIG. 8B have a combination of FOV having a maximum azimuth and elevation angular range that includes the axial direction of pivot axis 123 and radial direction 162 of pivot axis 123 in the wrist of robot 1.

Figure 9B:
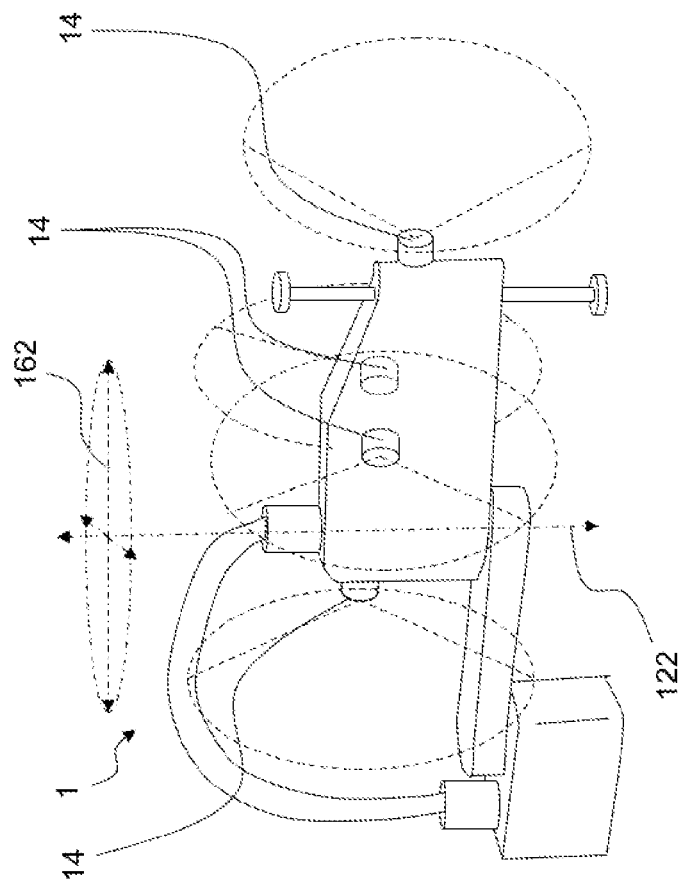
FIG. 9B is a diagram of an illustrative SCARA type robot having object detecting sensors in its elbow, wrist, and position between its elbow and wrist in accordance with some embodiments.
Figure 9A:
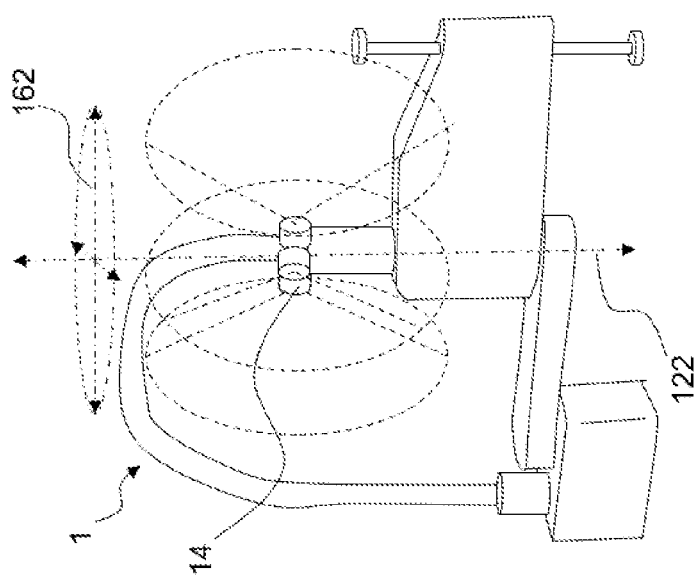
FIG. 9A is a diagram of an illustrative SCARA type robot having object detecting sensors on top of its elbow in accordance with some embodiments.

FIG. 9A and FIG. 9B show more examples of mounting object detecting sensors 14 on a SCARA type robot. In the example shown in FIG. 9A, object detecting sensors 14 may be disposed in a ring mounted near the elbow of robot 1. In the example shown in FIG. 9B, robot 1 may include object detecting sensors 14 mounted in the back side of the elbow, in the front side of the elbow, and in two sides of the casing of the linkage between the elbow and the wrist of robot 1. The examples shown in FIG. 9A and FIG. 9B have a combination of FOV having a maximum azimuth and elevation angular range including the axial direction of pivot axis 122 and radial direction 162 of pivot axis 122 in the elbow of robot 1.

Within the examples disclosed in FIG. 8A, FIG. 8B, FIG. 9A, if desired, object detecting sensor 14 may include 2D lidar (e.g., laser radar or optical radar) that generates a rotating distance reading in a two-dimensional plane within an azimuth FOV. In such a case, the FOV may only cover the radial directions 162 of the motion axis in the elbow or the wrist.

Object detecting sensor 14 may include any desired types of proximity sensor, for example, a radar sensor, a lidar, an optical imaging sensor (e.g., 2D camera or 3D camera), or an imaging radar (e.g., an array of transmitter and receiver antenna of radio wave that can generate 3D point cloud).

For object detecting sensors that generate a two-dimensional image, a depth image, or multiple detection points of the object and/or environment, the detection of an intruding object may be performed by safety control module 132 (FIG. 1), which may process the signal generated by object detecting sensor(s) 14 (e.g., in a form of point cloud, or image features, or points of detection), and which may compare the signal to a set (predetermined) environmental model. The signals generated by object detecting sensors 14 may sometimes be referred to herein as object detecting sensor signals, sensor output signals, or sensor signals, and may convey information produced by the object detecting sensors and indicative of the presence of external objects (e.g., intruding objects or persons). The set environmental model may be generated by preset digital data, a CAD file, or an environmental scan using object detecting sensors 14, as examples. If desired, the safety control module may process the information received from these types of object detecting sensors 14 along with information identifying the mounting position of each object detecting sensor 14 and the joint positions of the robot to align the generated image or point cloud to the same coordinate (e.g., a coordinate located in the base or one movable linkage of the robot).

Radar, for example, a millimeter wave radar (e.g., operating at millimeter wave frequencies greater than about 30 GHz), may also be used as object detecting sensor 14. Radar has some advantages compared to imaging sensors (e.g., Lidar, 3D camera) such as cost, size (e.g., the thickness or volume, especially only considering the antenna, which may be on a printed circuit), occlusion effect (e.g., a non-line-of-sight radar technology), and robustness in detecting objects within a severed environment (e.g., with smoke or particles in the air). By contrast, a radar may not be able to generate digital pixels of an object's image, like a 3D lidar or a 3D camera, and may exhibit a lower angular (e.g., 30 degrees of angular resolution for a radar comparing to 1 degree of angular resolution of a lidar) or a lower distance resolution. So, there is a need to have an improved method and system for radar in performing object detection in HRC (e.g., as object detecting sensor 14).

Referring back to FIG. 2, object detecting sensors 14 may include a frequency modulated continuous wave (FMCW) radar that operates at millimeter and/or centimeter wave frequencies, or at other frequencies. The FMCW radar may include at least one transmitting (TX) antenna and at least one receiving (RX) antenna. The TX antenna may transmit radio-frequency signals (radio waves) that include a continuous and cyclic frequency modulated wave. The RX antenna may receive a reflected version of the transmitted radio-frequency signals. the one or more processors in the robot system may process the transmitted radio-frequency signals and the received radio-frequency signals to generate information identifying the presence, absence, location, and/or velocity (motion) of external objects in the FOV of object detecting sensor 14.

For an FMCW radar, an object's distance to the antenna can be generated by comparing the frequency of the reflected radio-frequency signals with the continuous modulated frequency of the transmitted radio-frequency signals (e.g., from a lower frequency continuously in a time modulated to a higher frequency) and by identifying the time difference between the transmitted and received signals. The external object's speed can also be generated by comparing the phase difference of two reflections having the same frequency. The sensitivity of an object's speed is high for a radar compared with other types of sensors like an imaging sensor. Sometimes, minute human movements or actions, such as breathing, can be detected by a radar sensor. In FIG. 2, safety control module 132 (in FIG. 1) may be configured to check if there is any object having a speed larger than a set threshold in first monitoring zone 51, by processing the detected object speed signal from the radar type object detecting sensors 14 considering the speed of the object detecting sensors 14—which can be generated by signals received from joint monitoring elements 16 by safety control module 132, and the mounting position of the object detecting sensors 14 on the movable linkages of robot 1. Safety control module 132 may establish a ground truth of the speed of the object detecting sensors 14 by considering the motion of the robot. By excluding the effect brought by the motion speed of the object detecting sensors 14, the robot system may detect if there is any object moving in the monitoring zone. These kind of examples have some advantages compared to imaging sensors, in that the processing is simple and the safety control module has no need to maintain and process huge amounts of detections (e.g., point clouds) or to perform comparisons with set environmental data (which may need to be constructed with a huge amount of data points or complex geometries) within a very short amount of time (considering the possible motion speed of a robot), which implies a very high cost for the safety control module while at the same time the environmental data needs to be updated or re-scanned when the environment changes.

For the examples of the robot system set with a shell-like first monitoring zone 51 which detects only the intrusion of an object in a set belt-like range, for example, when first monitoring zone 51 has an internal boundary 511 (FIG. 2 and FIG. 10), processing of the radar's detection signal may include a simpler means to neglect the received radio wave signals expected to be out of the processing monitoring zone by checking the frequency and/or amplitude of the received radio wave signals. These kind of examples may simplify processing cost since there is no need to generate the position of the object, but only to check if any object is moving in the set monitoring zone.

If desired, the robot system may have a manual or autonomous resume function to allow the robot to re-initiate a motion from a standstill status (e.g., for an industrial robot that has no other collaborative safety function), or resume to a high motion speed (e.g., for a robot that has collaborative safety functions to allow motions with a collaborative speed when sharing a working space with humans0) when no human is present in the monitoring zone. A manual resume function may be provided by any kind of safety input (e.g., a physical button, a software button, recognition means like gesture or voice) to be performed by a human. An autonomous resume function may be provided by object detection sensors 14 to confirm there is no human presence in the monitoring zone.

For the examples that allow continuous sensing, for example, for the robot system continuously having non-covered FOV projection smaller than a set minimum detectable object size, like some of the examples shown in FIG. 2, the object detecting sensors 14 may be used to detect there is no human present and to allow the robot to leave a safety status (e.g., standstill or a limited collaborative speed). For the examples in which the robot system may only maintain covered FOVs smaller than the object to be detected or not a superset of a set dimension of the object to be detected, like the example shown in FIG. 6F, which may have non-covered FOVs inside the working range of the robot in which human presence may not be detected, or a robot system that has limited performance of object sensors and it may be hard to detect a human who is not in motion in the monitoring range (e.g., comparing with an intruding speed into the monitoring range), like a radar has a lower resolution in speed, there are some more examples to perform a safety autonomous resume function.

Figure 10:
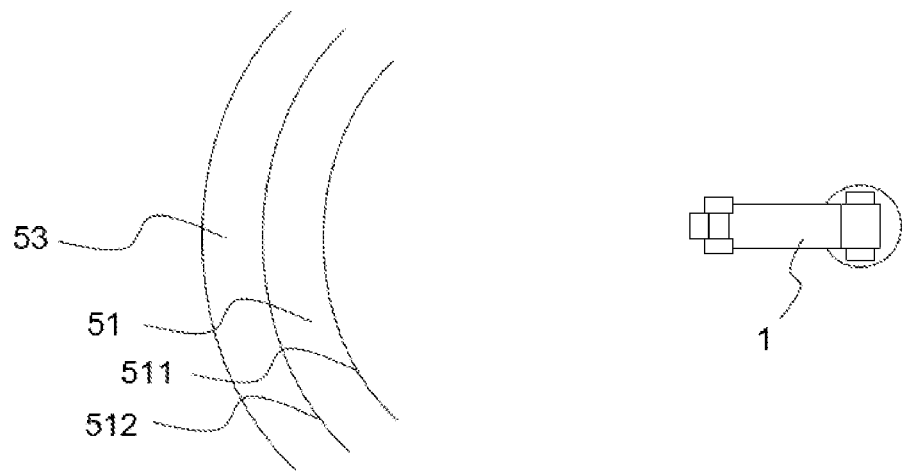
FIG. 10 is a diagram of an illustrative robot set with multiple monitoring zones in accordance with some embodiments.

Referring to FIG. 10, a robot system that has limited object detecting sensing performance or detecting coverage near a robot 1, may be configured to have a first monitoring zone 51 having an external boundary 512 and internal boundary 511 for detecting any intruding object. Safety control module 132 (FIG. 1) may be configured to detect (identify) an intruding object with a speed larger than a set (predetermined) threshold and having an approaching direction towards the robot. The safety control module may further detect (identify) a departing object when an object is detected in the first monitoring zone 51 for which the speed is larger than a set (predetermined) threshold with a direction moving away from the robot. Then, safety control module 132 may count the amount of detected intruding objects and departing objects to determine the amount of the intruding objects existing within a range to the robot and may re-initialize its motion or have a higher motion speed than a collaborative speed contingent on checking that there is no human presence in a set range.

In FIG. 10, another example for a method to detect the intruding object and departing object may be designed such that safety control module 132 (in FIG. 1) is configured to detect an intruding object by detecting any object in first monitoring zone 51. The safety control module may detect a departing object when an object is detected in the second monitoring zone 53, which is set farther away than first monitoring zone 51 (e.g., where first monitoring zone 51 defines an internal boundary of second monitoring zone 53) when its speed is larger than a set threshold with a direction away from the robot. The safety control module may decide to allow the robot to re-initialize a motion or move at a higher speed according the amount of intruding objects between a set range to the robot.

The examples of monitoring the number of intruding objects may be used to construct an autonomous resume function, and also may be used to perform as a pre-check or double check condition to allow a manual resume function to prevent a manual mistake (e.g., an improperly performed check to see whether a human is still present in the working range of robot).

If desired, a robot system that has a first monitoring zone 51 set with an internal boundary 511 (e.g., when the non-covered FOV of object detecting sensor 14 can only be maintained smaller than a set minimum detectable object within a belt-like first monitoring zone 51, due to the arrangement of the object detecting sensor or other reason) may further include a function to stop the robot safely if any intruding object is detected by the object detecting sensor between the internal boundary 511 and the robot. This may provide additional safety hazard reduction if an HRC environment is not well considered and constructed, the monitoring zones are not well-set (e.g., so that a human is able to avoid being detected in the first monitoring zone 51), or a situation where a human is present or hides in the non-covered FOVs of the object detecting sensors inside the internal boundary 511 before the robot is powered-on.

Figure 11:
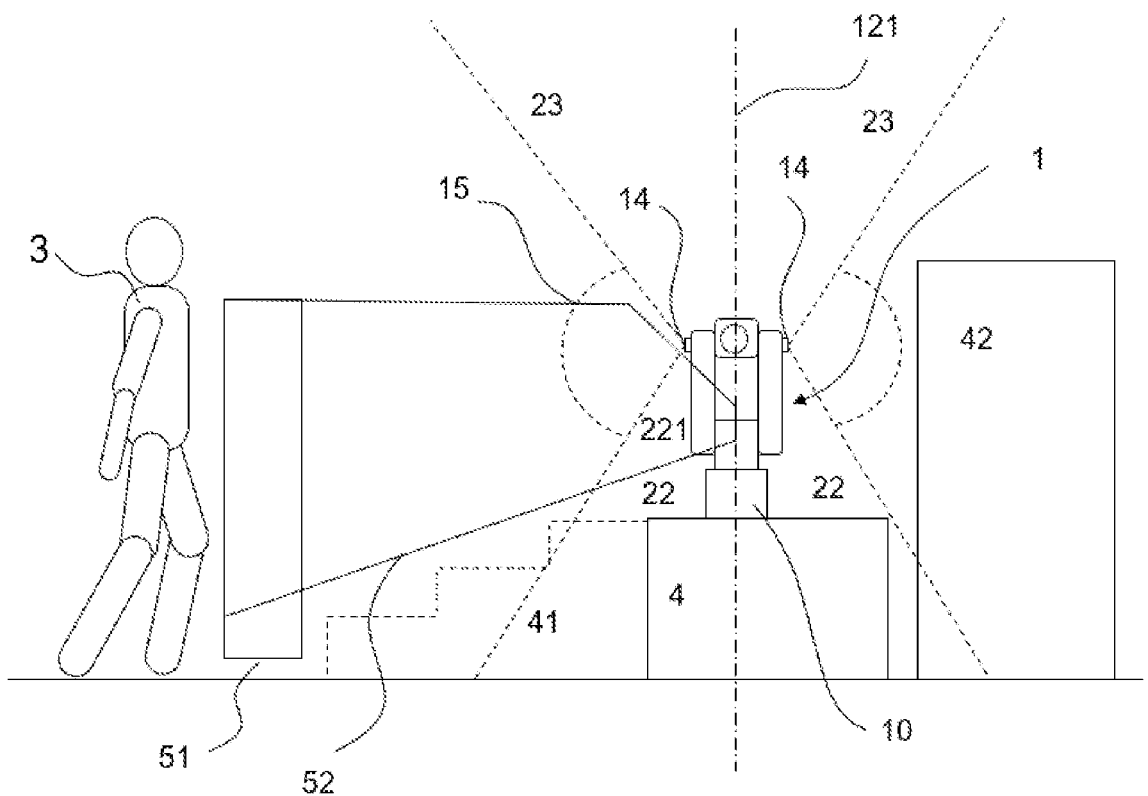
FIG. 11 is a diagram of an illustrative robot in a human-robot collaboration application in accordance with some embodiments.

FIG. 11 shows examples of the robot system set with different kinds of monitoring zones. As shown in FIG. 11, robot 1 may be mounted on table 4, and an obstacle (e.g., a machine cabinet), is placed on the right-hand side of the table, which blocks the presence of a human. In this arrangement, a human can only approach robot 1 from the left-hand side of table 4. Robot 1 may include object detecting sensors 14 in each side of the elbow, having FOV 15. Then, the robot system may set a monitoring zone 51 which is a cylindrical shell having a cylindrical axis centered to the rotational axis 121 in the base 10 of robot 1, trimmed with the right-hand side of the table 4. The monitoring zone has a height to the floor that is sufficient to cover the possible position of a human's torso, to stop or decrease the speed of robot 1 when an object (e.g., human 3) is detected in monitoring zone 51, in conjunction with a manual resume function or an autonomous resume function that considers the number of intruding and departing objects. When there is another structure 41, like a stairs or stage shown in the figure, that may further limit the possible position of a human, the robot system may set a monitoring zone 52 if desired, which may be a solid cylindrical volume, trimmed with the right-hand side of the table 4, and which has concave tapered shapes in the top and bottom surface. In this case, the monitoring zone 52 may be sufficient to cover the minimum detectable object from the external boundary of the monitoring zone to the position robot 1 is mounted, so the robot system may be able to provide an autonomous resume function in conjunction with a continuous monitoring of the presence of a human in the monitoring zone. Monitoring zone 52 may be sufficient because the non-covered FOV of the object detecting sensor, for example the non-covered FOV 22 and 23, may either not be included in the monitoring zone 52, or has the intersections in monitoring zone 52 (e.g., intersection volume 221) to have a projection smaller than the object to be detected, or not a superset of a set dimension of the object to be detected Because there may be a complex relation between a sufficient monitoring zone, a sufficient coverage of object detecting sensor's FOV, and a case-by-case constructed environment, when desired to perform an optimized HRC scenario, the robot system may generate a software interface (e.g., a graphical user interface (GUI) displayed on a display) to visualize the monitoring zones, the coverage of object detecting sensor's FOV, and the environment in a two-dimensional or three-dimensional way of visualization, and may simulate the relationship between them for the possible working range of the robot, for users to check and set safety settings including monitoring zones and space or joint limits of the robot. The visualization or the simulation may be performed by one or more processors in the robot system, and the one or more processors may be included in controller 13 or in another computer which visualizes and/or simulates offline and then communicably coupled with the controller 13 to transmit the safety settings.

Furthermore, if desired, the object detecting sensors mounted near elbow, elbows, and/or wrist, may perform a gesture detection function to provide an intuitive guiding function to the robot. For imaging type sensors such as 2D cameras, one or more processors in the robot system may detect and recognize a gesture by image processing. For other imaging type sensors that include depth detections like 2D or 3D lidar, 3D cameras, one or more processors in the robot system may detect and recognize a gesture by multiple depth detections or a point cloud. For a radar type object detecting sensor, for example, a millimeter wave radar, may provide a beamforming function to provide a scan of directional radio wave within the FOV to have multiple detections for the one or more processors in the robot system to detect and recognize a gesture. For some types of the object detecting sensors, the object detecting (e.g., intrusion detection) and gesture detecting may be performed with the same frame of detections, for example, some lidar or camera. For other cases, if some sensors may need to change their settings or configurations according to these two different usages (for example, focal length, or initializing a beam forming function), then the robot system may have a switching function between the object intrusion detecting and a gesture recognition function. For example, the robot system may use the radar type object detecting sensors to detect an intruding object in a belt-shape monitoring zone within a 2 meters distance, and may decrease the motion speed of the robot to a set collaborative speed once an intruding object is detected in the monitoring zone, and then switch the function of the object detecting sensors to a gesture detection function, with or without some other additional instruction (e.g., maybe also a gesture instruction) to allow the robot to perform a gesture guiding function. Other than a switching function based on object intrusion, considering some kind of object detecting sensors, for example, solid-state sensors, may switch between different detecting configurations fast enough (e.g., not be limited by mechanical elements), if desired, the object detecting sensor may switch between an object detecting function and gesture detecting function repeatedly with a high frequency, to have both functions at the same time.

Utilizing the same object detecting sensor arranged around the elbow, elbows, wrist, or the position between an elbow and a wrist, may provide advantages to guide a robot, because these positions are also key actuating joints of a robot. For example, the robot system which includes a six-axis articulated robot, may have object detecting sensors arranged in the elbow, like object detecting sensor 14*a*1, 14*a*2, 14*b*1, 14*b*2, and 14*b*3 in FIG. 3 and FIG. 4 for gesture guiding function to move the elbow according to the position of a user's hand detected, and allow the user to manipulate the robot by gesturing to grab, hold, or drag its elbow. Refer to FIG. 1, for example, in a six-axis robot, elbow 17 may be seen as the distal (to the base 10) end of linkage 112, and linkage 112 is driven by motion axis 121 and 122 which may perform a pan-tilt like motion. So, grabbing and guiding elbow 17 may be set in the robot system to move linkage 112 with a pan-tilt like motion driven by motion axis 121 and 122. In this case, the robot system may not need to have additional gesture detecting sensors on the shoulder 19. The object detecting sensors arranged in the wrist of a robot, and the part between a wrist and an elbow may have similar effect. The object detecting sensors mounted in a wrist may further detect gestures to perform a 6 DOF (e.g., X, Y, Z, RX, RY, RZ) motion of tool end 116. If desired, a combination of gesture guiding of an elbow and a wrist may generate different motions of the robot. For example, when dragging (e.g., through gesture detection) the wrist solely may mean move the position of the wrist while keeping motion axis 123 from pivoting, but pivoting motion axis 122, and dragging both the elbow and wrist may mean pivoting motion axis 122 and 123 at the same time according to the instructed position of the elbow and the wrist.

While a particular form of the invention has been illustrated and described, it will be apparent that various modifications can be made without departing from the spirit and scope of the proposed disclosure. The foregoing embodiments may be implemented individually or in any combination.

What is claimed is:
1. A robot system comprising:
a base;
a plurality of movable linkages driven by joints with actuators, wherein a movable linkage in the plurality of movable linkages farthest from the base has a tool end and is configured to drive the tool end along an axis, the joints comprise a pivot joint hinging a proximal linkage and a distal linkage from the plurality of movable linkages, the pivot joint has at least one pivot axis, and the pivot joint is located in an elbow or a wrist of the robot system;
at least one joint monitoring sensor configured to monitor the joints;
one or more object detecting sensors mounted to at least one movable linkage of the plurality of movable linkages, wherein the one or more object detecting sensors are oriented to exhibit a total field of view that covers a direction selected from the group consisting of:
an axial direction of the at least one pivot axis of the pivot joint,
a radial direction of the at least one pivot axis of the pivot joint; and
a direction oriented between the axial direction and the radial direction of the at least one pivot axis of the pivot joint; and
one or more processors communicatively coupled to the joint monitoring sensors and the one or more object detecting sensors, the one or more processors being configured to:
detect an external object based on information generated by the one or more object detecting sensors, and
when the external object is detected intruding on a first monitoring zone, reduce a moving speed of at least one movable linkage of the plurality of movable linkages, wherein at least one non-overlapping space between fields of view of the one or more object detecting sensors has a projection in the first monitoring zone, and wherein an overlap of the projection with the external object is smaller than a size of the external object when the at least one movable linkage is moving in a set movable range.

2. The robot system of claim 1, wherein the one or more object detecting sensors comprise a sensor selected from the group consisting of: an optical radar, an optical imaging sensor, an array of proximity sensors, and an imaging radar, wherein the one or more processors is configured to detect the external object intruding on the first monitoring zone by comparing a set environmental model and detections performed by the one or more object detecting sensors, and wherein the set environmental model is generated by an element selected from the group consisting of: a preset digital data, a computer-aided design (CAD) file, and the one or more object detecting sensors.

3. The robot system of claim 1, wherein the one or more object detecting sensors comprise a radar sensor comprising at least a radio wave transmitter and a receiver, the one or more processors is configured to:
detect a speed of the external object based on an output of the radar sensor;
compensate the detected speed when the at least one movable linkage is moving based on a position of a mounting point of the radar sensor and kinematics of the robot system, and
detect that the external object is intruding on the first monitoring zone when the external object has a speed greater than a set threshold.

4. The robot system of claim 3, wherein the first monitoring zone has an external boundary and the one or more processors is configured to neglect radio wave signals received at the receiver from a location expected to be outside of the first monitoring zone based on a frequency or amplitude of the radio wave signals received at the receiver.

5. The robot system of claim 3, wherein the first monitoring zone has an internal boundary and the one or more processors is configured to stop motion of the at least one movable linkage when the external object is detected as intruding within the internal boundary of the first monitoring zone.

6. The robot system of claim 1, wherein the one or more processors is configured with one or more immunity zones within the first monitoring zone, in which the one or more processors does not detect whether the external object is intruding.

7. The robot system of claim 1, wherein the object detecting sensor comprises at least two detecting elements with overlapping detecting fields of view, and wherein the one or more processors is configured to:
compare sensing information from the at least two detecting elements, and
stop motion of the at least one movable linkages while a difference in the sensing information is greater than a set threshold.

8. The robot system of claim 1, wherein the one or more processors is configured to detect that the external object is intruding on the first monitoring zone when the one or more processors detects that the external object has a speed greater than a set threshold and an approaching direction, wherein the one or more processors is further configured to detect that the external object is a leaving object when the one or more processors detects that the external object has a speed greater than the set threshold with a direction away from at least one movable linkage, and wherein the one or more processors is further configured to control the at least one movable linkage to re-initialize a motion or increase its speed according to one or more conditions including a number of intruding objects within a set distance from the at least one movable linkage.

9. The robot system of claim 1, wherein the one or more processors is further configured to:
detect that the external object is a departing object when the external object is detected in a second monitoring zone with a speed greater than a set threshold and a direction away from the at least one movable linkage, the second monitoring zone having an internal boundary defined by an external boundary of the first monitoring zone, and
control the at least one movable linkage to re-initialize a motion or increase speed according to one or more conditions including a number of external objects detected as intruding within a set range of distances from the at least one movable linkage.

10. The robot system of claim 1, wherein the set movable range is constrained by a set limit, the one or more processors is configured to monitor positions of one or more position monitoring points on one or more of the movable linkages, and the one or more processors is configured to stop motion of the at least one movable linkage when any of the monitored positions exceeds the set limit.

11. The robot system of claim 1, further comprising a vertical articulated robot that includes the plurality of movable linkages, the plurality of movable linkages having four or more degrees of freedom.

12. The robot system of claim 1, further comprising a software interface including a two-dimensional or three-dimensional visualization of the one or more fields of view of the one or more object detecting sensors.

13. The robot system of claim 12, the one or more processors being further configured to simulate the one or more fields of view of the one or more object detecting sensors according to a motion of the at least one movable linkage.

14. The robot system of claim 1, further comprising a guiding function in which the one or more processors moves the at least one of the movable linkages according to output from the one or more object detecting sensors.

15. The robot system of claim 14, further comprises a switching function to switch the one or more processors between detecting whether the external object is intruding and performing a gesture detection function.

16. The robot system of claim 1, wherein the one or more processors is configured to, when the intruding object is detected in the first monitoring zone, stop motion of the at least one movable linkage of the plurality of movable linkages.

17. The robot system of claim 1, wherein the one or more processors is configured to, when the intruding object is detected in the first monitoring zone, monitor a speed of one or more monitoring points on the plurality of movable linkages and stop the at least one movable linkage when the monitored speed exceeds a set speed limit.

18. The robot system of claim 1, wherein the one or more object detecting sensors are oriented to exhibit a total field of view that covers an axial direction of the at least one pivot axis of the pivot joint and a radial direction of the at least one pivot axis of the pivot joint.

19. A robot comprising:
a base;
a plurality of movable linkages coupled to joints with actuators, wherein the joints comprise a pivot joint hinging a proximal linkage and a distal linkage from the plurality of movable linkages, and the pivot joint having at least one pivot axis;
an object detecting sensor mounted to at least one movable linkage of the plurality of movable linkages, the object detecting sensor having a total field of view that covers a direction selected from the group consisting of:
  an axial direction of the at least one pivot axis of the pivot joint,
  a radial direction of the at least one pivot axis of the pivot joint; and
  a direction oriented between the axial direction and the radial direction of the at least one pivot axis of the pivot joint; and
one or more processors configured to:
  detect an external object based on information generated by the one or more object detecting sensors, and
  when the external object is detected within a monitoring zone proximate the robot, reduce a speed of at least one movable linkage of the plurality of movable linkages, wherein at least one non-overlapping space between fields of view of the object detecting sensor has a projection in the monitoring zone, and wherein an overlap of the projection with the external object is smaller than a size of the external object when the plurality of movable linkage is moving in a set movable range.

20. Apparatus comprising:
one or more object detecting sensors mountable to at least one movable linkage in a plurality of movable linkages of a robot, the one or more object detecting sensors having at least a first field of view, a second field of view, and a total field of view that includes the first field of view and the second field of view, wherein the total field of view is oriented to overlap:
  an axial direction of a pivot axis of a pivot joint between the plurality of movable linkages,
  a radial direction of the pivot axis, or
  a direction oriented between the axial direction and the radial direction of the pivot axis; and
one or more processors communicatively coupled to the one or more object detecting sensors and configured to:
  detect an external object based on information generated by the one or more object detecting sensors, and
  when the external object is detected intruding on a first monitoring zone, reduce a moving speed of the robot, wherein at least one non-overlapping space between the first field of view and the second field of view has a projection in the first monitoring zone, and wherein an overlap of the projection with the external object is smaller than a size of the external object when the at least one movable linkage is moving in a set movable range.

* * * * *